March 4, 1924.
D. D. ELDER
1,485,970
VEHICLE HEADLIGHT
Filed Dec. 8, 1920
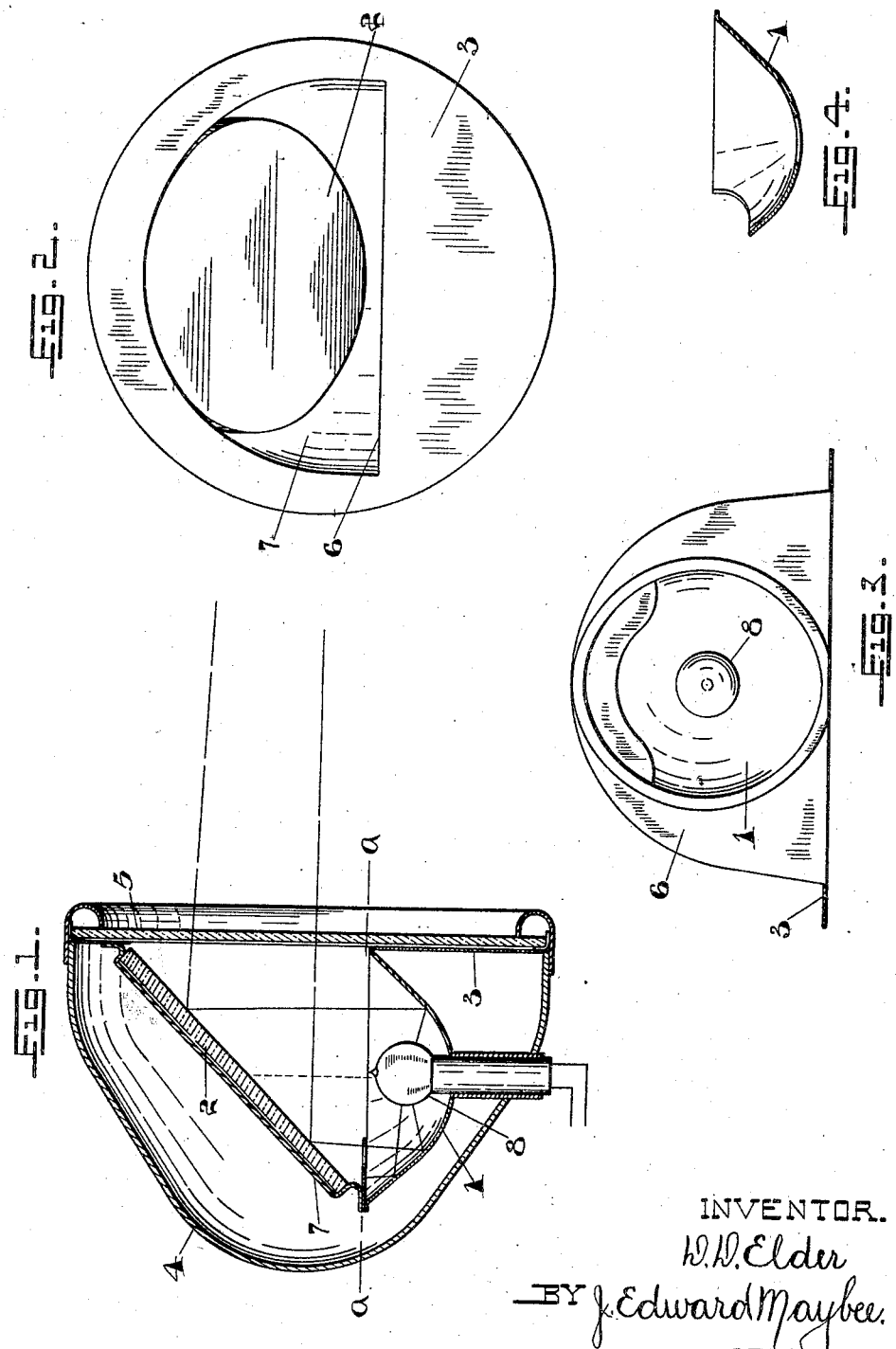
INVENTOR.
W. D. Elder
BY J. Edward Maybee
ATTY.

Patented Mar. 4, 1924.

1,485,970

UNITED STATES PATENT OFFICE.

DONALD D. ELDER, OF TORONTO, ONTARIO, CANADA, ASSIGNOR TO ELLIPTIC AUTO LIGHT LIMITED, OF TORONTO, CANADA, A CORPORATION OF ONTARIO, CANADA.

VEHICLE HEADLIGHT.

Application filed December 8, 1920. Serial No. 429,123.

*To all whom it may concern:*

Be it known that I, DONALD D. ELDER, of the city of Toronto, in the county of York, Province of Ontario, Canada, a subject of the King of Great Britain, have invented certain new and useful Improvements in Vehicle Headlights, of which the following is a specification.

This invention relates to light projecting apparatus for use as a headlight for vehicles designed to prevent objectionable glare, and my object is to devise a headlight of this type which will fit within the lamp casings now in common use, which will give sufficient diffused light adjacent the vehicle to enable roadside signs to be easily read, which will spread the light beam laterally and contract it vertically, which at the distance of 75 to 100 feet will give a maximum of road lighting relative to the candle power of the source of light, which will dispense with the use of refracting media with the consequent absorption of light, which will require the minimum use of shielding means, and which at all distances from the headlight will reduce to a safe minimum the amount of light rising above the horizontal.

I attain my object by means of the constructions hereinafter described and illustrated in the accompanying drawings in which—

Fig. 1 is a vertical section of a headlight constructed in accordance with my invention;

Fig. 2 a front elevation of the same;

Fig. 3 a section on the line *a—a* in Fig. 1; and

Fig. 4 a plan view showing a slight modification of the concave reflector.

In the drawings like numerals of reference indicate corresponding parts in the different figures.

1 is a concave reflector, preferably of the usual approximately paraboloidal shape in section. In plan, however, the usual circular form of such reflectors is departed from and a substantially elliptical form adopted for transverse sections of the reflector as will be noted particularly on reference to Figs. 3 and 4.

Supported opposite the mouth of the reflector is a plane mirror 2, which is set substantially at an angle of 45° to the optical axis of the reflector 1. In practice the concave reflector will be set with the major axis of its elliptical horizontal sections in a direction parallel to the direction in which the beam of light from the apparatus is to be projected. The mirror must therefore be set so that imaginary lines formed by the intersection of its surface by horizontal planes are substantially parallel with the minor axes of the elliptical horizontal sections of the concave reflector.

In the preferred construction the reflector and the plane mirror are connected with the plate 3, which is adapted to be secured within a headlight casing 4 behind the glass front 5 thereof. This plate has an opening therein of suitable size and shape for the passage of the beam reflected from the plane mirror. Usually this opening will be semi-circular as shown, the straight edge of the semi-circle being approximately in the plane of the mouth of the concave reflector 1. The concave reflector is preferably supported from the plate 3 by the transverse plate 6 secured to the plate 3 and having the rim of the reflector 1 secured thereto. The plane mirror is supported in a metal frame 7 connected at its front edge to the plate 3 and its rear edge to the rear of the plate 6.

I find that the upward glare is reduced by locating the electric bulb 8, which forms the source of light, slightly in front of the optical axis of the mirror, as indicated in Figs. 2 and 3, the optical axis being indicated by a dotted line in Fig. 1. A certain amount of upward light is essential in a satisfactory headlight, but I find it desirable to still further limit the amount of light thrown upwardly by providing means for trapping light rays which normally reach the portion of the surface of the concave reflector immediately adjacent the plane mirror. This is most simply effected by providing a crescent shaped shield between the rim of the concave reflector and the adjacent edge of the plane mirror, though other means for preventing the reflection of light from the part of the concave reflector referred to to the plane mirror might be substituted. For example, the part of the surface of the reflector responsible for such rays might be cut away as shown particularly in Fig. 4.

It is found that with a headlight constructed as shown and described that the objects of my invention as set out in the preamble to this specification are satisfactorily attained, and that at distances of 75 to 100 feet, the upper surface of the beam is of substantially semi-elliptical form with the major axis parallel to the road surface, the upper edge of this beam being more or less sharply defined, the extent of illumination above such more or less sharply defined portion of the beam being well below the maximum permissible.

What I claim as my invention is:—

1. In a headlight, the combination of a concave reflector of elliptical form in tranverse cross section; a source of light located within said reflector; a plane mirror supported adjacent the concave reflector inclined longitudinally so that the optical axis of the reflector intersects its reflecting surface at substantially an angle of 45° and set so that the axis of the beam reflected therefrom is substantially in the same plane as the major axes of the elliptical transverse sections of the concave reflector; and means to trap light rays which normally reach the portion of the edge of the concave reflector immediately adjacent the plane mirror.

2. In a headlight, the combination of a concave reflector of elliptical form in transverse cross section; a source of light located within said reflector; a plane mirror supported adjacent the concave reflector inclined longitudinally so that the optical axis of the reflector intersects its reflecting surface at substantially an angle of 45° and set so that the axis of the beam reflected therefrom is substantially in the same plane as the major axes of the elliptical transverse sections of the concave reflector; and a narrow crescent shaped shield between the rim of the concave reflector and the adjacent edge of the plane mirror.

Signed at Toronto, Canada, this 19th day of November, 1920, in the presence of the two undersigned witnesses.

DONALD D. ELDER.

Witnesses:
GEO. P. MACKIE,
HUGH ROSE.